United States Patent [19]
Kellner

[11] 3,929,582

[45] Dec. 30, 1975

[54] METHOD AND APPARATUS FOR CULTURING MICROORGANISMS

[76] Inventor: Maximilian Kellner, Untere Hauptstrasse 34, 805 Freising, Germany

[22] Filed: Feb. 13, 1974

[21] Appl. No.: 442,213

[30] Foreign Application Priority Data
Feb. 19, 1973 Germany............................ 2308087

[52] U.S. Cl................ 195/107; 195/139; 195/142; 195/109
[51] Int. Cl............................................. C12b 1/14
[58] Field of Search ........... 195/109, 115, 116, 139, 195/140, 141, 142, 107

[56] References Cited
UNITED STATES PATENTS
1,732,921   10/1929   Bratton.............................. 195/109
3,740,320    6/1973   Arthur................................ 195/109

Primary Examiner—A. Louis Monacell
Assistant Examiner—R. B. Penland
Attorney, Agent, or Firm—Hans Berman

[57] ABSTRACT

Microorganisms are cultured aerobically in a fermentor from which a gas is discharged above the level of the culture medium, automatically analyzed for at least one gaseous component whose concentration is affected by the metabolism of the microorganisms, and replenished for the consumed gaseous component to maintain a desired concentration, whereupon the replenished gas is dispersed in the culture medium. The amount of recirculated gas is only a very small fraction of the amount of sterile air conventionally required for aerobic cultures. Gaseous products of metabolism of the microorganisms may be absorbed from the circulating gas before it is returned to the fermentor. Two cultures of which one produces the carbon source for the other may be coupled in a single circulating gas stream.

9 Claims, 1 Drawing Figure

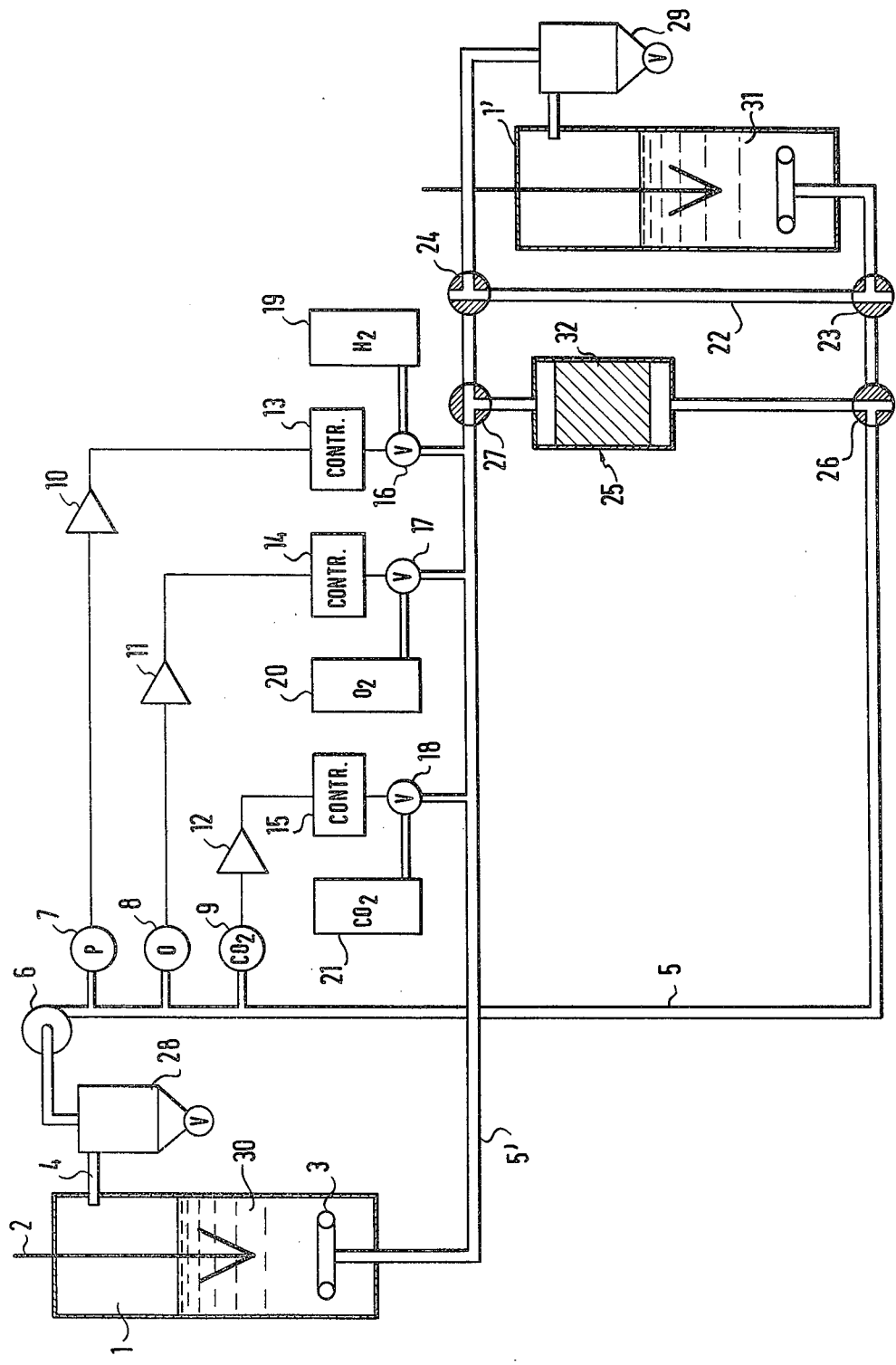

METHOD AND APPARATUS FOR CULTURING MICROORGANISMS

This invention relates to fermentation, and particularly to a method of culturing microorganisms and to apparatus for performing the method.

In its more specific aspects, the invention is concerned with the culturing of aerobic micoorganisms. It is common practice to disperse a continuous stream of air in active cultures to provide the oxygen necessary for the metabolism of the microorganisms. The gas employed for aeration must be sterile in almost all aerobic fermentation processes, and the cost of sterilizing and conveying the large amounts of gas required may amount to one third of the total cost of the culturing operation. When liquid hydrocarbons are employed as carbon sources in an otherwise aqueous medium, the air volume required for conventional aeration is even higher than for cultures in which carbohydrates provide the carbon source. The diffusion of oxygen into the culture medium is impeded by the presence of the hydrocarbons, and the aeration gas must make up for the lack of combined oxygen in the hydrocarbons. When gaseous hydrocarbons, such as natural gas or its components, are employed as carbon sources, or when hydrogen is required for the metabolism of the aerobic microorganism that it is desired to culture, the gas mixture discharged from the fermentor may be explosive and represent a serious disposal problem.

A primary object of the invention is the provision of a culturing method which avoids the difficulties enumerated above and inherent in conventional fermentation processes in which a gas is dispersed in a liquid culture medium in an amount sufficient to cause gas to be discharged from the culture medium.

Another important object is the provision of apparatus suitable for performing the method of the invention.

With these and other objects in view, as will hereinafter become apparent, the method of the invention comprises the steps of dispersing a feed gas in a liquid culture medium inoculated with the microorganism to be cultured. The rate at which the feed gas is supplied is sufficient to cause gas to be discharged from the medium. The dispersed gas includes a gaseous material which is consumed by the microorganism during cultivation. The concentration of this gaseous material in the gas discharged from the medium is sensed, a signal indicative of the sensed concentration is generated, and the discharged gas is replenished with the gaseous material in response to the signal to maintain a desired concentration. The replenished gas then is recycled to the culture medium for dispersal therein as feed gas.

The fermentation apparatus employed comprises a fermentation vessel sealed from the ambient atmosphere and equipped with supply and discharge conduits whose orifices are arranged at different levels in the vessel. The supply and discharge conduits are connected by a feedback conduit. A circulating fan or its equivalent is provided for withdrawing gas from the fermentation vessel through the discharge conduit and for returning the withdrawn gas to the vessel sequentially through the feedback and supply conduits. One or more sensing devices sense the amount of a corresponding number of gaseous components in the gas which is being returned to the vessel and produce signals in response to the sensed amounts. A valve responds to each signal for admitting a supplemental amount of the corresponding component from a suitable source to the feedback conduit.

Other features, additional objects, and many of the attendant advantages of this invention will readily become apparent from the following detailed description of preferred embodiments when considered in connection with the appended drawing whose sole FIGURE illustrates apparatus for performing the method of the invention by conventional symbols.

The illustrated apparatus includes two identical fermentors 1, 1' which are sealed from the ambient atmosphere and each equipped with an agitator 2. A sparger ring 3 is arranged near the bottom of the fermentor as a supply pipe for a gas to be dispersed in an aqueous culture 30, 31 in the fermentor. A discharge pipe 4 has its orifice at a level above that of the sparger ring 3 near the top of the fermentor.

A section 5 of a feedback conduit connects the discharge pipe 4 of the fermentor 1 to the sparger ring of the fermentor 1', and a second section 5' of the feedback conduit connects the discharge pipe of the fermentor 1' to the sparger ring 3 of the fermentor 1. A circulating fan 6 in the section 5 permits a gas to be recycled continuously through the two fermentors and the feedback conduit.

A pressure gage 7, and probes 8, 9 for oxygen and carbon dioxide, conventional in themselves, communicate with the conduit section 5 and produce electrical output signals which are fed to respective amplifiers 10, 11, 12. The amplified signals are transmitted to controllers 13, 14, 15 for pneumatically operated valves 16, 17, 18. The valves respectively connect a hydrogen tank 19, an oxygen tank 20, and a carbon dioxide tank 21 to the section 5' of the feedback conduit.

A by-pass conduit 22 is connected to the sections 5, 5' by respective two-way valves 23, 24 which permit the fermentor 1' to be disconnected from the feedback conduit. A column 25 containing an absorbent material 32 is similarly connected between the sections 5, 5' of the feedback conduit by valves 26, 27.

As is conventional, but not explicitly shown, the fermentors 1, 1' are equipped with automatic pH control equipment which senses the pH of a liquid culture medium in each fermentor and adds acid or base to hold the pH value of the medium within a desired range that may be set at will. A jacket, not shown, partly envelops each fermentor and is thermostatically controlled to receive steam or cooling water to maintain the culture at the optimum fermentation temperature. Mechanical defoaming and other conventional auxiliary devices will also normally be provided. The loss of liquid droplets from each fermentor with the discharged gas is reduced or prevented by traps 28, 29 at the discharge pipes.

As will be illustrated by specific examples, the apparatus is capable of different modes of operation for which it is set by means of the two-way valves 23, 24, 26, 27. The gas discharged from the fermentor 1 may be recycled directly to the sparger ring 3 of the same fermentor through the by-pass conduit 22 or it may be returned to the fermentor 1 through the absorption column 25. Ultimately, the gas discharged from the fermentor 1 may be fed to the sparger ring of the fermentor 1', and the discharged gas from the latter returned to the sparger ring 3 of the fermentor 1.

Total pressure, oxygen, and carbon dioxide in the gas being recycled to the fermentor 1 through the feedback conduit section 5 may be determined by means of the gage 7 and the probes 8, 9 in each of the operating modes, and hydrogen, oxygen, and carbon dioxide under pressure admitted to the feedback conduit section 5' by the valves 16, 17, 18 to maintain a desired concentration of the gases in the circulating gas stream.

The illustrated apparatus is versatile enough for experimental and pilot plant operation. It represents the three types of apparatus which may be employed for practicing specific embodiments of the method of this invention, and it will be understood that the sensing equipment and associated controllers and valves may be modified to maintain a desired concentration of fewer or more components in the circulating gas stream, and to control gaseous components other than those specifically mentioned by way of example.

The three modes of operating the illustrated apparatus will be evident from the following Examples which further illustrate the invention.

EXAMPLE 1

A fermentor 1 having a useful capacity for about 50 liters of liquid and equipped with an agitator 2 and sparger ring 3 as illustrated and described above was charged with an aqueous culture medium 30 consisting of 450 g $Na_2HPO_4 \cdot 12H_2O$, 75 g $KH_2PO_4$, 50 g $(NH_4)_2SO_4$, 10 g $MgSO_4 \cdot 7H_2O$, 25 g $NaHCO_3$, 500 mg $CaCl_2$, 50 mg ferric ammonium citrate, 100 ml of Hoagland's trace element solution, and enough water to make 50 liters. The automatic pH control of the fermentor was set for pH 6.9 to 7.0.

The fermentor, its contents, and associated conduits were sterilized, and the culture medium was inoculated with 5 liters of a seed culture of Hydrogenomonas eutroplya ATCC 17 699. The air in the fermentor 1 and in an associated feedback conduit 5, 5' was displaced by sterile hydrogen. The valves 16, 17, 18 connecting the feedback conduit to the three pressure tanks 19, 20, 21 respectively containing hydrogen, oxygen, and carbon dioxide, were controlled by the sensing elements 7, 8, 9 in the feedback conduit and set, respectively, for a pressure of 1.2 bar, 18.0 – 20.0 percent oxygen, and 9.0 – 11.0 percent carbon dioxide, all percentage values of gases in these Examples being by volume. The gas mixture was recirculated from the discharge conduit 4 of the fermentor 1 to the sparger ring 3 of the same fermentor directly through the feedback conduit at a rate of 50 liters per minute while the temperature of the fermentor was held at 28° to 30°C.

Sixty hours after inoculation, the fermentor was emptied, and was found to contain 644 g of filterable microbial material containing 82% water. The wet bacterial material thus contained 116 g dry substance of which 53.4 g or 46.1% was found to be crude protein suitable as a feed supplement. The total amount of consumed gas was 3050 liters hydrogen, 720 liters oxygen, and 420 liters carbon dioxide, all as measured at 760 mm Hg and 0°C (STP).

EXAMPLE 2

The fermentor 1 described in Example 1 was sterilized and charged with a culture medium consisting of 250 g $(NH_4)_2HPO_4$, 100 g $KH_2PO_4$, 50 g $Na_2HPO_4 \cdot 12H_2O$, 5 g $MgSO_4 \cdot 7H_2O$, 100 ml trace element solution, and water to make 50 liters. The carbon source introduced into the fermentor consisted of 5 kg of a gas oil fraction containing 15% (by weight) of assimilable n-alkanes, calculated as hexadecane. The automatic pH control of the fermentor was set for 5.4 to 5.6

An absorption column 25 of 5 liter capacity was connected between the two sections 5, 5' of the feedback conduit which connected the sparger ring 3 and the gas discharge pipe 4 of the fermentor. The absorption column contained coarsely granular, porous soda-lime absorbent 32. The oxygen concentration in the feedback conduit was sensed, and the amplified output signal of the oxygen probe controlled the valve connecting the storage tank 20 under pressure to the feedback conduit section 5'.

The culture medium was inoculated with 5 liters of a seed culture of Candida ulilis ATCC 9256. The oxygen controller 14 was set for maintaining an oxygen concentration of 28 to 30 percent by volume in the sterilized air which was recycled at a rate of 50 liters per minute. The fermentor was kept at 28° to 30°C. Neither hydrogen nor carbon dioxide was supplied.

After 60 hours of culturing, the fermentor 1 was found to hold 3675 g filterable yeast material containing 80% water. The 735 g solids on a dry basis obtained from the culture contained 51.3% or 377 g crude protein which was produced at a consumption of 420 liters (STP) oxygen. About 180,000 liters of sterile air (STP) would have been required to produce an equal amount of proteinaceous feed supplement if the gas discharged from the fermentor had not been replenished and returned to the fermentor.

EXAMPLE 3

The absorption vessel 25 filled with soda-lime in the apparatus employed in Example 2 was replaced in the gas circuit by the second, identical fermentor 1', and the supply conduit of each fermentor was coupled to the discharge conduit of the other fermentor. The respective culture media of Example 1 and Example 2 were inoculated in the two fermentors with the corresponding microorganisms, and the gas stream recycled between the two fermentors was enriched with hydrogen and oxygen in the manner described in Example 1. The carbon dioxide necessary for the growth of the bacteria in one fermentor was furnished by the yeast in the other fermentor, and the bacteria prevented an excessive build-up of carbon dioxide in the gas supplied to the yeast as effectively as the soda-lime absorber had operated in Example 2.

After 60 hours of culturing, the two fermentors yielded 3675 g of filterable yeast substance and 644 g bacterial substance respectively. The total crude protein recovered weighed 430 g on a dry basis. 3050 liters hydrogen and 1140 liters oxygent (STP) were consumed.

This invention does not reside in the specific microorganisms employed nor in the fermentation products that are to be produced. The microorganisms mentioned in the Examples may be replaced by others, or suitably matched pairs of other microorganisms in the manner of Example 3. Extracellular products of metabolism may be recovered as the desired product rather than the microbial protein without otherwise making significant changes in the process.

The apparatus illustrated may be modified for continuous fermentation in a manner too obvious to require specific description. As shown in Example 1, the method of the invention may be carried out at elevated pressure which is maintained uniform in the entire gas circuit. Because that circuit is sealed from the ambient atmosphere, the method is advantageous where radioactive materials are to be handled, as in the production of isotope labeled compounds by fermentation.

The specific features of the apparatus are determined largely by the required operating conditions and the scale on which the fermentation is carried out. On an experimental or pilot plant scale, it will now normally be desirable not to lose process gas in the automatic analysis apparatus, whereas analytical methods removing samples from the principal gas circuit are acceptable in operations on an industrial scale. The analytic and control apparatus needed is commercially available. The oxygen concentration in the circulating gas may be determined polarographically, by mass spectrometry, or by gas chromatography, and the test results may be evaluated automatically and converted to control signals. Carbon dioxide is routinely determined by means of pH electrodes, IR absorption spectrometry, mass spectrometry, or gas chromatography. Some of the same methods are available for the determination of gaseous hydrocarbons. A single gas component, or the predominant gaseous component can be determined conveniently and simply by merely measuring the pressure of the gas under otherwise stable conditions, as shown in Examples 1 and 3.

Other modifications of the illustrated apparatus may be resorted to meet specific requirements. The agitator 2, sparger ring 3, and circulating fan 6 may be combined in a single device which draws the gas into the liquid, disperses the gas in the liquid, and agitates the latter. Suitable equipment is commercially available (Turbo-Gas-Absorber of General American Transportion Corp.; Cavitator of Yeomans Brothers Co.).

It should be understood, therefore, that the foregoing disclosure relates only to preferred embodiments of the invention, and that it is intended to cover all changes and variations in the examples chosen for the purpose of the disclosure which do not constitute departures from the spirit and scope of the invention set forth in the appended claims.

What is claimed is:

1. A method of culturing a microorganism in a closed stystem which comprises:
   a. dispersing a feed gas in a liquid nutrient medium inoculated with the microorganism to be cultured at a rate sufficient to cause gas to be discharged from said medium,
      1. the dispersed gas including a gaseous component,
      2. a portion of said component being consumed by said microorganism during the culturing thereof, and
      3. the non-consumed remainder of said component constituting a part of said discharged gas;
   b. sensing the concentration of said component in said discharged gas;
   c. generating a signal indicative of the sensed concentration;
   d. replenishing said discharged gas with an additional amount of said component in response to said signal; and
   e. recycling the replenished gas including said non-consumed remainder and said additional amount of said component to said medium for dispersal therein as feed gas.

2. A method as set forth in claim 1, wherein said discharged gas contains a gaseous product of metabolism of said microorganism, and said gaseous product is removed from the discharged gas prior to said recycling.

3. A method as set forth in claim 2, wherein said gaseous product is removed from said discharged gas by dispersing said discharged gas in a culture medium while another microorganism is being cultured in said other medium, said other microorganism consuming said gaseous product during the culturing thereof on said other medium, the remainder of said discharged gas being withdrawn from said other culture medium and recycled to said first-mentioned medium.

4. A method as set forth in claim 1, wherein said microorganism is aerobic, and said gaseous component is elementary oxygen.

5. A method as set forth in claim 4, wherein said dispersed gas essentially consists of said oxygen, of hydrogen, and of carbon dioxide.

6. Fermentation apparatus comprising, in combination:
   a. a fermentation vessel sealed from the ambient atmosphere;
   b. a supply conduit having an orifice in said vessel at a first level;
   c. a discharge conduit having an orifice in said vessel at a second level higher than said first level;
   d. a feedback conduit connecting said supply conduit and said discharge conduit;
   e. circulating means for withdrawing a gas from said vessel through said discharge conduit and for returning the withdrawn gas to said vessel through said feedback conduit and said supply conduit;
   f. sensing means for sensing the amount of a gaseous component in the gas withdrawn from said vessel and for generating a signal in response to the sensed amount;
   g. a source of said gaseous component; and
   h. valve means responsive to said signal for admitting a supplemental amount of said gaseous component to said feedback conduit.

7. Apparatus as set forth in claim 6, wherein said supply conduit, said discharge conduit, said feedback conduit, and said source are sealed from said atmosphere.

8. Apparatus as set forth in claim 7, wherein said feedback conduit has two sections, and gas absorbing means operatively interposed between said two sections for absorbing a gaseous component from the gas being returned to said vessel.

9. Apparatus as set forth in claim 8, wherein said gas absorbing means include a second fermentation vessel and a living culture of microorganisms in said second vessel.

* * * * *